US005730603A

United States Patent [19]
Harless

[11] Patent Number: 5,730,603
[45] Date of Patent: Mar. 24, 1998

[54] AUDIOVISUAL SIMULATION SYSTEM AND METHOD WITH DYNAMIC INTELLIGENT PROMPTS

[75] Inventor: William G. Harless, Bethesda, Md.

[73] Assignee: Interactive Drama, Inc., Bethesda, Md.

[21] Appl. No.: 648,831

[22] Filed: May 16, 1996

[51] Int. Cl.⁶ .................................................. G09B 5/06
[52] U.S. Cl. .................................................. 434/308
[58] Field of Search .................................... 434/308, 309, 434/323; 273/429, 430, 431, 432

[56] References Cited

U.S. PATENT DOCUMENTS

| 4,804,328 | 2/1989 | Barrabee | 434/308 |
| 5,006,987 | 4/1991 | Harless | 364/419 |
| 5,219,291 | 6/1993 | Fong et al. | 434/323 |
| 5,413,355 | 5/1995 | Gonzalez | 273/429 |

*Primary Examiner*—William H. Grieb
*Attorney, Agent, or Firm*—Finnegan, Henderson, Farabow, Garrett, and Dunner, L.L.P.

[57] ABSTRACT

An audiovisual simulation system and method facilitates simulated human interaction between a user and a prerecorded human character. It does so by providing dynamic intelligent prompts to guide users unobtrusively during simulated human interactions in order to support a continuous dialogue and sustain a natural conversational rhythm. Various interactive instructional learning tools are available to assist users of the system in maximizing learning opportunities.

42 Claims, 7 Drawing Sheets

STATE "3" (OUT="1,2,5,6,4")

| WORD # | QUESTIONS | ORDER # | AFTER | NOT AFTER |
|---|---|---|---|---|
| 01 | "IS BREAST CANCER ON THE INCREASE?" | 1 | | |
| 09 | "WHAT'S CAUSING THE INCREASE?" | | 01 | |
| 07 | "WHAT'S THE MOST IMPORTANT FACTOR?" | 2 | | |
| 11 | "WHY WOMEN OVER 50?" | | 07 | |
| 12 | "ARE YOUNG WOMEN SAFE?" | | 11 | |
| 08 | "CAN I REDUCE MY RISK?" | 7 | | |
| 06 | "DOES BEING OVERWEIGHT MATTER?" | 3 | | |
| 10 | "DOES DRINKING ALCOHOL MATTER?" | 4 | | 06 |
| 05 | "COULD I INHERIT BREAST CANCER?" | 5 | | |
| 04 | "WHAT IF A FAMILY MEMBER HAS HAD IT?" | | 05 | |
| 02 | "DOES HAVING CHILDREN MATTER?" | 6 | | |
| 03 | "DOES PREGNANCY MATTER?" | | 02 | 08 |

FIG. 5

700 — PREVIOUSLY DISPLAYED SCENE SEGMENTS 0002
0006
0010
0011

FIG. 7

AUDIOVISUAL SIMULATION SYSTEM AND METHOD WITH DYNAMIC INTELLIGENT PROMPTS

BACKGROUND OF THE INVENTION

The present invention relates generally to an audiovisual simulation system and method for simulating an interaction between persons. More particularly, the present invention relates to an audiovisual simulation system and method for providing dynamic intelligent prompts and interactive instructional learning tools.

In various fields of education, and particularly in professional education, hands-on learning opportunities in a real-world setting pose risk of harm due to improper student action. For example, traditional forms of medical education allow students to interact with actual patients only under supervision of a physician. A medical student is thus prohibited from directly making independent decisions involving treatment of a patient. Nevertheless, it is extremely desirable for medical students to interact with patients in early stage of their educational process in order to gain practical experience and build a solid foundation through which the students can apply their theoretical knowledge.

Conventional audiovisual simulation systems enable a medical student to interact independently with simulated patients. Harless, U.S. Pat. No. 5,006,987, discloses one such system. The Harless patent discloses an interactive audiovisual system employing a voice recognition unit and a programable videodisc player to provide an interactive simulated drama.

The interactive audiovisual system of Harless provides natural means of interaction for the student to increase realism and maximize educational effectiveness. Additionally, it provides a continuous audiovisual display of stored dramatic scenes to heighten the illusion of an actual physician-patient relationship. It further increases realism of an interactive audiovisual system by influencing, though not completely determining, the outcome of the displayed audiovisual drama according to student input to the system.

Before initiating a simulated drama, however, the user needed to voice-train the system to recognize spoken command words and terminology uttered by the user in the simulated dialogue with a video character. This type of voice recognition technology is known as "speaker dependent" recognition. Each user must train the system with a set of words or phrases before the system can recognize the spoken words or phrases of that individual. Once the user voice-trains the system, the user can converse "face-to-face" with simulated characters whose video responses are prestored on a videodisc. For example, in a medical patient simulation, a user who voice-trains the system can interview the simulated patient to obtain diagnostic data and make management decisions.

Recent advances in spoken language technology enhanced the speech recognition power by adding an "independent speaker" recognition capability, which allows virtually any user to converse with the simulated characters without first training the system. This development in speech technology provides exciting new opportunities for profound educational experiences. Individuals will learn from experts through "face-to-face" dialogue. For example, women concerned about breast cancer can have an extensive dialogue with a friendly female oncologist about mammograms, biopsies, and other related issues. Students at all levels will be able to actively participate in engaging situations which allow them to make their own decisions and learn from their performance. Language students will have the opportunity to dialogue with native speakers and experience a simulated immersion in that culture and language.

However, the independent speaker capability has raised new difficulties on the user side of a simulation. In the dependent speaker system, the user was typically a faculty person or presenter who had voice-trained the system and was familiar with the scenarios and questions that could be asked as well as the video character's possible responses. Armed with the experience of having voice-trained the entire vocabulary and the knowledge about the simulation content, the presenter could bring the scenario to life for the audience and handle any random, spontaneous recognition problems that might occur. The faculty presenter could pre-script questions for their "dialogue" with the video character or interact spontaneously using their style and wit to maintain the illusion of conversation with the video character in front of the audience.

With the independent speaker recognition, the system must be capable of supporting the illusion of a conversation for any individual user. An uninformed user may, unfortunately, experience difficulty in maintaining a continuous, successful dialogue and sustaining a conversational rhythm. This is because there is no faculty presenter and the user personally controls the flow of the scenarios and interacts independently with the characters in those scenarios in an unrehearsed session.

Therefore, it is desirable to provide intelligent prompts to guide the user to ask in-context questions relevant to the video character's response and to eliminate the need for users to study linear, static menu of questions before initiating simulation.

It is also desirable to assist users by providing immediate access to interactive instructional references in order to enhance learning.

It is further desirable to correctly recognize user's independent spoken questions and provide quick responses to maintain a natural conversational rhythm.

SUMMARY OF THE INVENTION

Accordingly, the present invention is directed to an interactive audiovisual system that substantially obviates one or more of the problems due to limitations and disadvantages of the related art.

In accordance with the purposes of the present invention, as embodied and broadly described, the invention provides an interactive audiovisual system for simulating a human interaction between a user and a simulated video character relating to a plurality of topics where each topic corresponds to a different state. The present invention includes storing means, receiving means, selecting means, and displaying means. There are three storing means: first storing means for storing a plurality of prerecorded audiovisual scenes; second storing means for storing a plurality of prompts categorized into states, the prompts representing suggested voice input from the user, the prompts being associated with the audiovisual scenes; third storing means for storing a set of sound patterns. Means for receiving voice signals corresponds to a voice input from the user. Means for associating the received voice signals with a corresponding one of the stored sound patterns is responsive to the receiving means and the third storing means. The two selecting means include first selecting means, responsive to the associating means, for selecting from the first storing means audiovisual scenes corresponding to the received voice signals; and second selecting means, responsive to the first selecting means, for selecting from the second storing means a predetermined number of stored prompts corresponding to the selected audiovisual scenes. The two displaying means include first displaying means for displaying the selected audiovisual scenes, and second displaying means for sequentially displaying the selected prompts.

According to another aspect of the present invention, a method for simulating a human interaction between a user and a simulated video character relating to a plurality of topics, each topic corresponding to a different state, includes various steps. There are several items stored in memory: a set of sound patterns; a plurality of prerecorded audiovisual scenes of the simulated video character; and a plurality of prompts categorized into states. A sound card receives voice signals corresponding to a voice input from the user. Recognition program associates the received voice signals with a corresponding one of the stored sound patterns. Conversation simulation program selects one of the stored audiovisual scenes corresponding to-the received voice signals as well as a predetermined number of the stored prompts corresponding to the selected audiovisual scenes. Finally, the selected audiovisual scenes and the selected prompts are displayed on a monitor.

BRIEF DESCRIPTION OF THE DRAWINGS

The accompanying drawings, which are incorporated in and constitute a part of this specification, illustrate one embodiment of the invention and together with the description, serve to explain the principles of the invention.

In the drawings,

FIG. 5 shows is a table illustrating a sequence of the dynamic intelligent prompts stored in a FSG (Finite State Grammar) table;

FIG. 7 shows a table illustrating a list of previously displayed scene segments.

DESCRIPTION OF THE PREFERRED EMBODIMENT

Reference will now be made in detail to the preferred embodiment of the present invention, an example of which is illustrated in the accompanying drawings.

Figure 1:
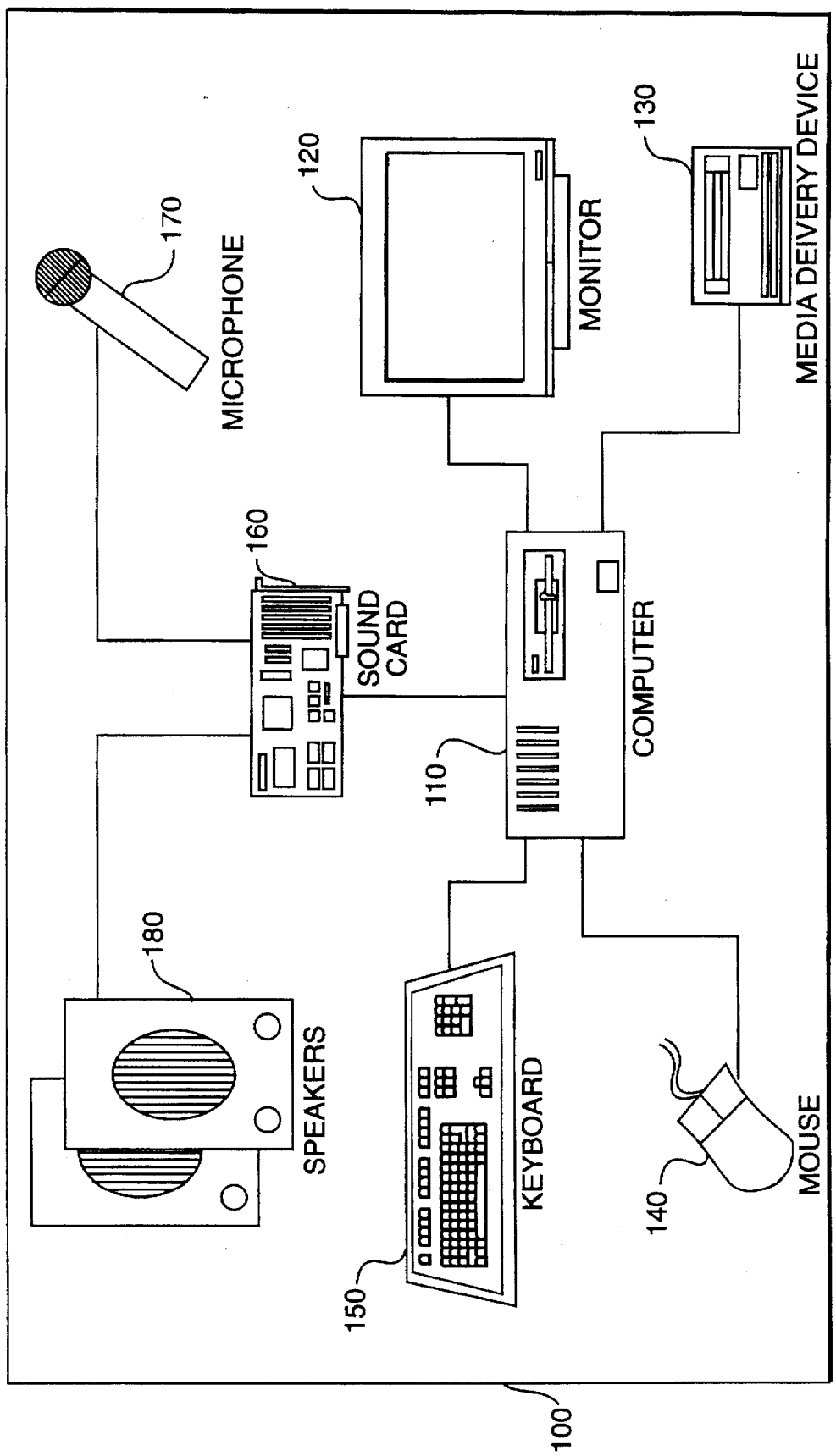
FIG. 1 is a diagram of an audiovisual simulation system according to a preferred embodiment of the present invention.

FIG. 1 is a diagram of a preferred embodiment of the present invention. As shown in FIG. 1, a computer system 100 includes a computer 110 having a monitor 120, a media delivery device 130, a mouse 140, a keyboard 150, and a sound card 160. Computer 110 is also connected to a microphone 170 and speakers 180. In the preferred embodiment, computer 110 is an IBM-compatible personal computer with a Pentium 90 processor and 8 MB RAM, preferably running Windows '95. Monitor 120 is preferably a SVGA monitor with 800×600×256 video capability. Media delivery device 130 is preferably a videodisc player or a 4X CD ROM drive that stores scenes as a series of frames. Media delivery device 130 contains two groups of scenes. The first group relates to scenes of a story and characters involved in the simulated drama. The second group contains scenes providing a visual and textual knowledge base associated with the simulated topic. Each frame on device 130 is addressable and is accessible in a maximum search time of 1.5 seconds. Sound card 160, which may be located inside computer 110, is preferably a Sound Blaster 16 or a comparable sound card made by Reveal. Detailed description of hardware components and implementation are disclosed in the above-mentioned Harless patent.

Figure 2:
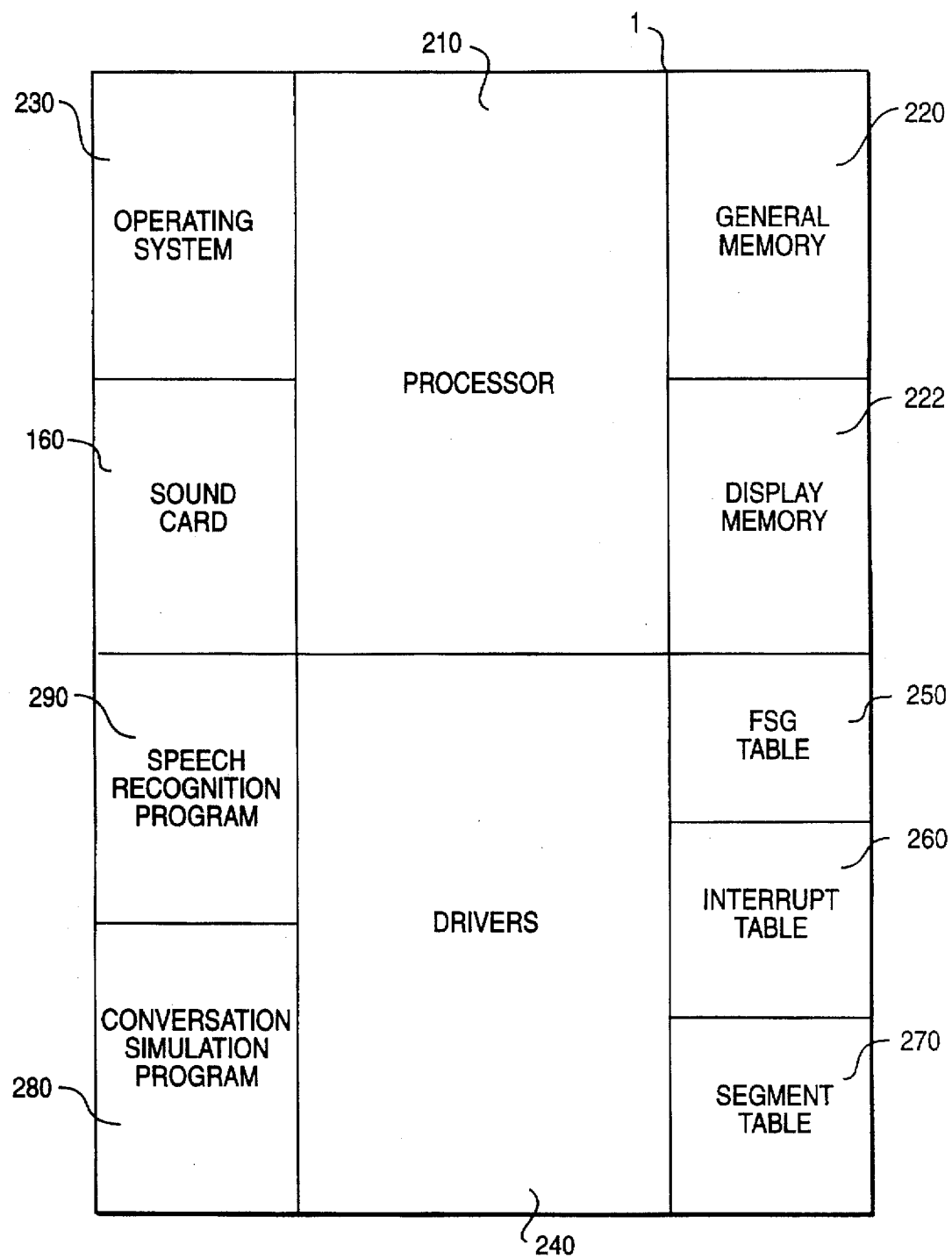
FIG. 2 is a schematic diagram illustrating in detail components of a computer shown in FIG. 1.

FIG. 2 shows a schematic diagram illustrating components of computer 110. A processor 210 is preferably a Pentium 90 processor. An operating system 230 is preferably Windows 95. Computer 110 has 8 MB RAM composed of a general memory 220 and a display memory 222. Drivers 240 control various input and output devices connected to computer 110. Computer 110 also contains a FSG table 250, an interrupt table 260, and a segment table 270, all of which will be explained below. Sound card 160 is also located within computer 110. Additionally, a conversation simulation program 280 controls the overall process of a simulation using the information contained in tables 250, 260, and 270. A speech recognition program 290 recognizes voice input. Conversation simulation program 280 and speech recognition program 290 will be explained below in detail.

System 100, operating on a Windows 95 platform with speech recognition program, does not require voice-training the system by each user before initiating simulation. During set-up, system 100 "learns" a set of vocabulary necessary for the simulation. Speech recognition program 290, preferably of a type commercially available from Dragon Systems, facilitates this by analyzing a cross section of high and low pitch voice samples of the vocabulary set and storing its averages. Speech recognition program 290 stores each vocabulary unit as a continuous sound pattern. Once the averaging process completes, speech recognition program 290 can recognize any speaker saying one of stored continuous sound patterns. A detailed description of the Dragon Systems independent speaker recognition software is disclosed in DragonVoiceTools Developer's Kit.

Upon conventional start-up of system 100, computer 110 runs conversation simulation program 280 to initiate the simulation process. Conversation simulation program 280 controls and supervises the overall simulation process. First, conversation simulation program 280 presents a display of available simulation scenarios on a variety of subjects to monitor 120. Each scenario is represented by an icon with a picture of the simulated character.

There are two categories of simulation scenarios, both of which access the first group of audiovisual scenes stored on media delivery device 130. The first category contains problem-solving scenarios. For example, one choice is the case of Frank Hall (a fictional character), an alcoholic who has recently been fired from his job as an engineer and whose marriage is ending. Details of the Frank Hall scenario are discussed in the above-mentioned Harless patent. Another simulated character is Patricia Fletcher (a fictional character), a chronically obese college professor who is seriously depressed about her weight. She has also recently lost a child in a drowning accident, and her sister, who was also obese, has just died of a heart attack. She is willing to discuss her personal life situation, and freely discloses the everyday difficulties and social injustices that an obese person faces in our society.

The second category of scenarios allow users to consult with an expert about a particular subject. For example, a patient facing the frightening possibility of breast cancer, using the prerecorded audiovisual scenes on media delivery device 130, can engage in a simulated conversation with Dr. Jackie Johnson, an actual real-life female oncologist, in a dialogue about breast cancer, mammography, biopsy, risk factors, and other related information.

The user selects a simulation scenario by clicking on the desired icon with mouse 140 and initiates a particular simulation scenario by speaking the command "Begin" into microphone 170. When the user speaks into microphone 170, sound card 160 receives; and digitizes the analog voice signal. Thereafter, a speech recognition program 290 analyzes the digitized voice signal as a continuous sound pattern. If speech recognition program 290 determines that the voice signal is not one of the stored sound patterns, system 100 remains idle until the user speaks a phrase corresponding to one of the stored continuous sound patterns.

Figure 3:
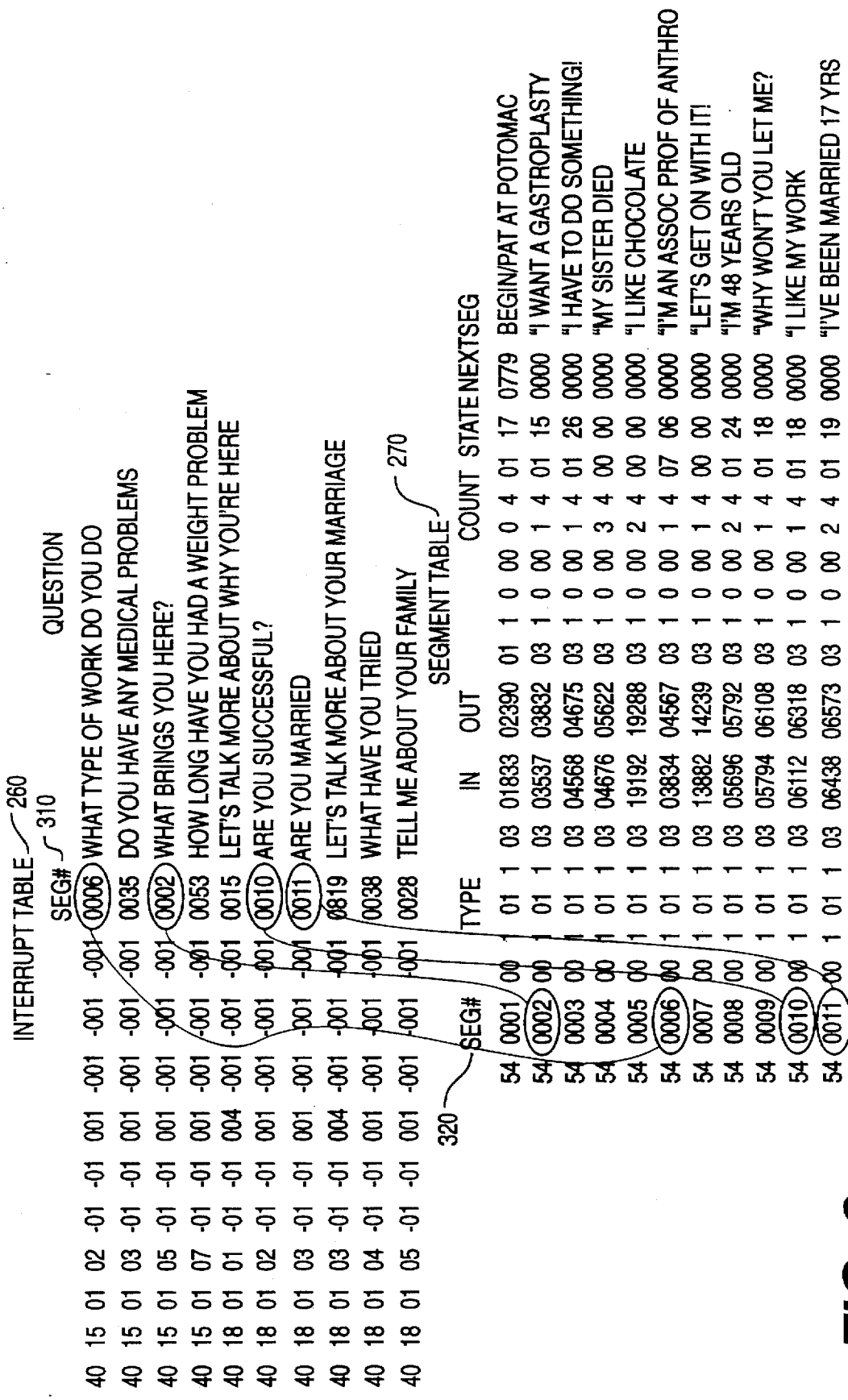
FIG. 3 shows a relationship between an interrupt table and a segment table.

Referring to FIGS. 2 and 3, if speech recognition program 290 recognizes the voice signal as one of the stored sound patterns, a conversation simulation program 280 accesses an interrupt table 260. Interrupt table 260 contains segment numbers 310 which point to an equivalent segment numbers 320 in a segment table 270. For example, the first segment number "0006" of interrupt table 260 points to segment number "0006" of segment table 270. Each segment number 320 of segment table 270 corresponds to a particular scenes stored on media delivery device 130. Conversation simulation program 280 then accesses the particular audiovisual scenes corresponding to the referenced segment, and outputs visual displays to monitor 120 and audio signals to speakers 180. This recognition process occurs each time the user speaks into microphone 170.

During certain points of the simulation, system 100 presents unobtrusive prompts at the bottom of the screen to guide the user who may be unfamiliar with the system and require assistance. Unlike traditional menus, the prompts do not elicit nor require an action from the user to continue. Therefore, the prompts provide guidance and access to on-line assistance to maximize the learning experience. Additionally, to minimize distraction, prompts do not appear when the simulation character is speaking.

If the user selects the Frank Hall scenario (alcoholic), conversation simulation program 280 accesses the corresponding start-up scenes stored on media delivery device 130. The drama begins with a full color action scene, including background music, of Frank Hall driving a large, battered automobile into a hospital parking lot. The scene changes to a disheveled Frank Hall at the emergency room reception desk. A dialog between Frank and an emergency room nurse takes place for approximately 30 seconds; then the action on monitor 120 freezes. This freeze in the action is called a "wait state." It serves as a subtle prompt to the user to take charge and respond.

While the scenes are displayed, conversation simulation program 280 starts a process of selecting dynamic intelligent prompts in the background. The dynamic intelligent prompts suggest relevant dialogue questions to the user in a unique and unobtrusive way. Therefore, it supports a continuous, successful dialogue between the user and the simulated character and sustains a conversational rhythm of the dialogue.

Figure 4:
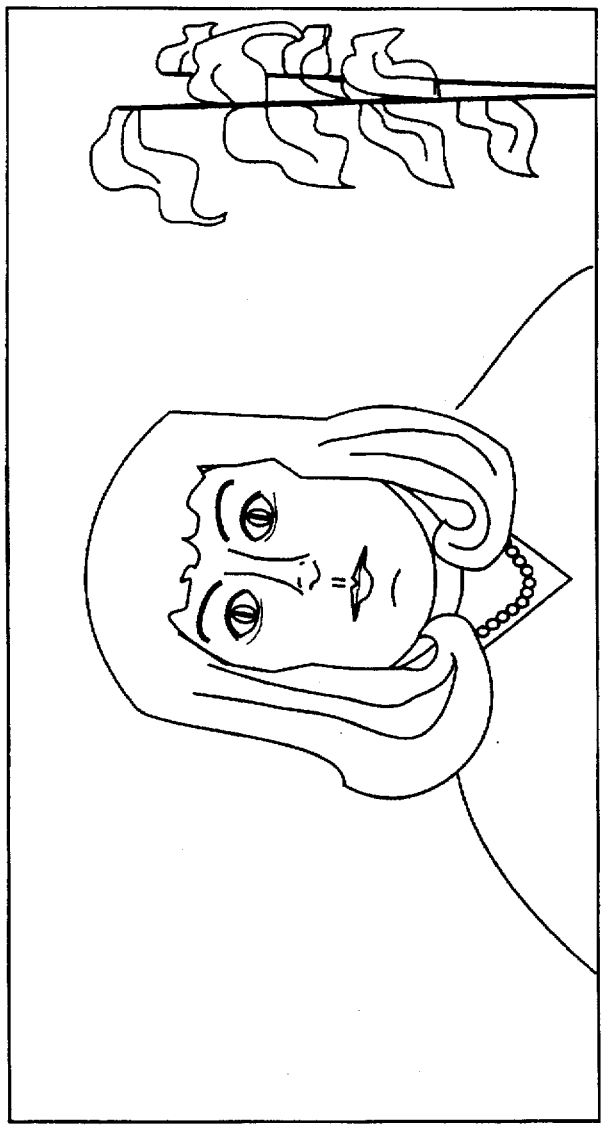
FIG. 4 is a screen print showing a dynamic intelligent prompt in operation.

As shown in FIG. 4, a group of three questions scroll sequentially, one at a time, in the center window at the bottom of monitor 120 below the picture of the simulated character. In the preferred embodiment, system 100 sequentially displays three questions because experimentation shows that three questions provide a good balance between possible confusion by too many questions, and the ineffectiveness of too few questions.

In the preferred embodiment, the user does not have to wait for a desired question to appear in the scroll window before asking that question. The three questions in the scroll window alternate continuously at a specified interval until the user responds. To speak to the character, the user speaks into microphone 170 the words of one of the scrolling questions or any question not suggested by the dynamic intelligent prompts. Speech recognition program 290 recognizes any of the stored continuous sound patterns regardless of whether the input voice signal corresponds to one of the displayed intelligent prompts.

Once the user speaks a question and speech recognition program 290 recognizes the voice input as one of the stored continuous sound patterns, conversation simulation program 280 accesses FSG table 250 shown in FIG. 5. FSG table 250 illustrates exemplary voice input for dynamic intelligent prompts and how the exemplary voice inputs are sequenced in the Jackie Johnson scenario (oncologist). Voice inputs may be a question, statement, or comment by the user. However, voice input will hereinafter be referred to as question for illustration purposes. Table 250 contains questions 520 and word numbers 510, which are unique numbers associated with each question. Sequencing of the questions is determined by ORDER number 530, AFTER status 540, and NOT AFTER status 550, each of which will be explained below.

In every scenario, a potential topic of conversation is assigned a state. For example, the Jackie Johnson scenario may contain state 1 relating to mammograms, state 2 relating to biopsy, etc. There is no practical limit to the number of states that can exist in a simulation scenario. FIG. 5 shows state 3 relating to general information about breast cancer.

Within each state are suggested questions 520 which the user may ask to elicit responses from the simulated character. There is no practical limit to the number of questions that can exist in a state. Each suggested question is assigned a word number 510 unique within that state. Additionally, each question is either assigned ORDER number 530 in the scroll, or placed in AFTER status 540 and/or NOT AFTER status 550. ORDER number 530 is assigned based on the relative importance of the question to the conversation and on its conceptual contiguity to other questions in that state.

In the alternative, questions are designated AFTER= [specified question] if the question corresponding to the AFTER status makes sense after the user has seen the audiovisual display triggered by the specified question. For example, the question associated with WORD number 09 is not selected for dynamic intelligent scrolling on monitor 120 until the user has seen the audiovisual scenes corresponding to WORD number 01. Additionally, when the user asks a question triggering an AFTER question, the associated specified question becomes the first item scrolled in the next cycle. For example, if the user asks "Is breast cancer on the increase?" corresponding to WORD number 01, then the AFTER question associated with WORD number 09 "What's causing the increase?" becomes the first item scrolled in the next cycle.

On the contrary, questions are designated NOT AFTER= [specified question] if the question corresponding to the NOT AFTER status does not make sense because the audiovisual display associated with the specified question has been previously displayed to the user. Accordingly, the system eliminates redundant or undesirable responses from the dialogue and makes the question selection more cogent. For example, if the user asks "Does being overweight matter?" corresponding to WORD 06, then the NOT AFTER question associated with WORD number 10 "Does drinking alcohol matter?" is excluded from the scroll selection. Under appropriate circumstances, questions may be simultaneously assigned both AFTER and NOT AFTER status.

Figure 6:
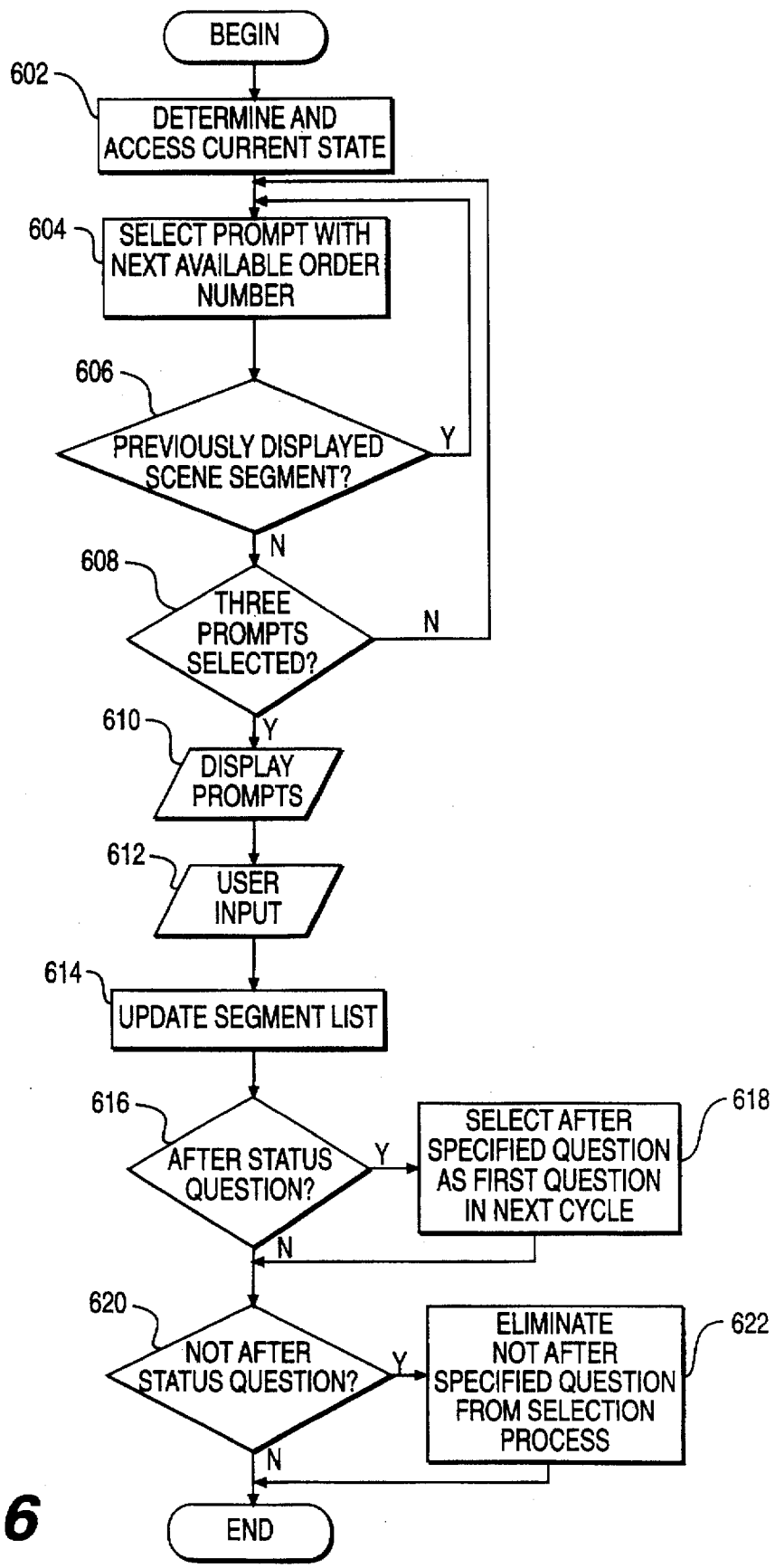
FIG. 6 is a flowchart illustrating the process of the dynamic intelligent prompts according to a preferred embodiment of the present invention.

Referring to FIGS. 5 and 6, the selection process for dynamic intelligent prompt scrolling will now be explained.

In selecting three questions for intelligent scrolling, conversation simulation program 280 first accesses the current state of the simulated interview based on segment number 320 of the immediately preceding audiovisual scene and accesses the corresponding portion of FSG table 250 (step 602). In the above example, state 3 of FSG table 250 is accessed. Thereafter, conversation simulation program 280 starts selecting questions based on ORDER number 530 (step 604). In this case, the first question chosen for intelligent prompt is the question with ORDER number 1, that is, "Is breast cancer on the increase?" with WORD number 01.

In order to avoid displaying redundant prompts that will trigger redundant scenes, conversation simulation program 280 maintains a list of previously displayed scene segments 700, as shown in FIG. 7. Conversation simulation program 280 bypasses a particular question in the sequence when selecting the question if the corresponding segment number of that question is in the list of previously displayed scene segments 700. To accomplish this, conversation simulation program 280 checks whether segment number 310 corresponding to WORD number 01 is in the list of previously displayed scene segments 700. If selection of the question with WORD number 01 is not redundant, then it is selected as one of the dynamic intelligent prompts. However, if segment number 310 corresponding to WORD number 01 is in list 700, then WORD number 01 is bypassed and the question with the next ORDER number that is not redundant is selected.

Conversation simulation program 280 repeats the above selection process until three questions are selected for display (step 608). Hence, WORD numbers 07, and 06 with the next two available ORDER numbers, 2 and 3 respectively, are selected for display.

Once three questions are selected for scrolling prompts, conversation simulation program 280 sequentially displays questions associated with WORD numbers 01, 07, and 06 on monitor 170 at a predetermined interval (step 610). These questions scroll repeatedly in that order until the user asks a question. If the user asks a question and speech recognition program 290 recognizes it as one of the stored continuous sound patterns (step 312), conversation simulation program 280 adds segment number 310 corresponding to the user-selected question to the list of previously displayed scene segments 700 (step 614). Consequently, neither the currently displaying scenes nor any question triggering the same audiovisual scene is displayed to the user throughout the remaining course of the simulation session.

Conversation simulation program 280 also checks whether the user-selected question has a corresponding AFTER question (step 616). As previously mentioned, for example, if the user asks WORD number 01 "Is breast cancer on the increase?" WORD number 09 with an AFTER=1 status becomes the first question in the next selection cycle (step 618). Similar process takes place for NOT AFTER specified questions. If the user selects a question that corresponds to a NOT AFTER specified question (step 620), conversation simulation program 280 eliminates the NOT AFTER question from subsequent selection process (step 622).

This question selection process continues until fewer than three items remain in the current state. At that point, conversation simulation program 280 looks to the out priority list (see FIG. 5, parenthetical list following "STATE '3'") for other states to find questions for scrolling prompts. Questions from other states that the system selects for this purpose are called "out" questions. The highest ordered question that is available from the highest priority "out" state is the first question added to the scroll selection.

In the present example, state 1 is the highest priority "out" state for "out" questions when the user is in state 3. State 1 is concerned with questions about the mammogram procedure, and the highest priority order question in that state is "What exactly is a mammogram?". The list of previously displayed scene segments 700 enables conversation simulation program 280 to determine which "out" questions corresponding to the previously displayed scenes are no longer available for scroll selection. If the audiovisual scene corresponding to the question has not been previously displayed, the question becomes the "out" question in the scroll. If a second "out" question is needed to complete the scroll, the next highest priority "out" state, i.e., state 2, is accessed. Thus, the highest priority "out" question in the next highest priority "out" state is selected. Hence, it is possible for the user to exhaust scroll questions from all states while continuing simulation in one state.

Additionally, if the user asks a question relating to a state different than the current state, conversation simulation program 280 automatically changes the state and displays an appropriate character response from the state relating to the posed question. When the response is completed, questions for scroll selection relate to the new state. This is done automatically because conversation simulation program 280 locates the appropriate audiovisual scene segment 310 of interrupt table 260 corresponding to the sound patterns recognized by speech recognition program 290. Therefore, conversation simulation program 280 provides a seamless movement between states without having to explicitly change states by manually choosing a different topic.

In addition to the dynamic intelligent prompts to guide the user during simulation, there are various interactive instructional tools designed to enhance the user's learning. These tools reside in the background and are available to the user on command. The interactive instructional tools access the second group of audiovisual scenes stored in media delivery device 130, which include both visual and textual knowledge base relating to the simulated scenario and the character. When any interactive instructional tool is invoked, conversation simulation program 280 temporarily suspends the simulated interview and reduces the image of the video character to a small size in the upper right hand corner.

First, the user may suspend the interview with the simulated character at any time to have a direct dialogue with an "expert consultant" about the circumstances involving the simulation, or see instructional text on monitor 170. The user may also maintain a problem list or continuous record of the user's decisions during the simulated dialogue. Another feature allows the user to "stop and study" by suspending the interview at any point to repeat previously asked questions and review information already seen. The user may re-initiate the simulation from any of the interactive instructional options at any time by speaking the phrase "Continue the interview." Each of the interactive instructional tools are described more fully as follows.

The expert consultant feature and instructional tools are invoked by user's voice command "Expert Consultant." The simulated interview is temporarily suspended and the image of the simulated character is minimized. If the user chooses the expert consultant option, a video image of an expert will appear on screen 120 and await a question from the user. As with the simulation interview, pertinent prompts scroll at the bottom of the screen to aid the user in a productive dialogue with the expert. In the Patricia Fletcher scenario (obesity/depression), for example, the prompts might include "Is depression a reasonable diagnosis at this time?" or "What is the appropriate clinical intervention?". The expert consultant feature takes full advantage of "the teachable moment" by instantly providing an expert to answer questions about circumstances or issues just experienced by the user. The user can resume the simulated interview at any time by saying the phrase "Continue the interview."

If the user chooses the instructional text option, however, cogent textual information analyzing and summarizing the current circumstance of the simulation is displayed. For example, text concerning normal grief reaction and symptoms of depression is displayed for the Patricia Fletcher scenario. The text also reveals that Patricia Fletcher's depression symptoms have gone beyond the normal period of grief, and her extreme sadness may be a sign of major depressive disorder. While in instructional text mode, the user can replay the patient's response from the "on hold" window to reinforce learning of the instructional material.

Another feature, the problem list option, allows the user to interrupt the simulated interview at any time to develop a list of desired information for subsequent retrieval. The user invokes this option by saying the phrase "Problem list." In the case of Patricia Fletcher, a list of nine depression symptoms are displayed on monitor 120 below the patient's image. Speaking any of the listed depression symptoms into microphone 170 causes that symptom name to appear in the user's on-screen problem list. This list is maintained throughout the simulation in general memory 220. The user can add to and display the list at any time to review which symptoms have or have not been detected. If, during the course of the session, the user decides that a particular symptom should not be on the list, the user can remove that symptom by using the "cancel" command.

Finally, the stop and study feature enables the user to interrupt the interview by saying "stop and study" at any time during the session. More specifically, the user may review a list of questions that have been asked and replay the patient's responses; review the instructional text statements that have been seen up to that point in the interview and replay the patient's associated responses; and access a glossary of psychiatric terms related to depression. This information accessible from general memory 220 where conversation simulation program 280 stores all input and output during the simulation.

The ability to review previously asked questions and previously displayed instructional text allows the user to more carefully listen to the content of the patient's response and study the expressions and body language of the patient. In stop and study mode, the user may repeat any of the previously asked questions as many times as the user chooses, and the patient will continue to respond. This enables the user to learn the simulation content at the user's own pace.

FIG. 4 illustrates the display of other commands which the user may input during the simulation. These are temporary help tools which after invoking, the user can terminate by saying the phrase "Continue the interview." Specifically, "Just a moment" allows the user to temporarily put the simulation on hold.

The phrase "Misrecognition" allows the user to notify the simulated character when the character misunderstands the user's input and outputs an incoherent response. When the user inputs this command, the character recognizes the error appropriately with comments such as "Would you repeat the question?" or "I am having trouble hearing." This tool is useful when the misunderstanding occurs during demonstration of the simulation in front of a large audience.

The phrase "Change the subject" changes the topic of the simulated scenario. For example, a patient asking questions about mammograms can change the dialogue topic to biopsies. When the user changes the topic, the dynamic intelligent prompts change accordingly.

The phrase "Illustrations" presents graphic display of the current topic. For instance, during a discussion about breast cancer, computer 110 displays a picture of a fluid-filled cyst.

The phrase "Current summary" displays a tabular summary of the current topic. The phrase "Previous questions asked" lists questions previously asked by the user in the order inputted. This tool maintains an exact running account of the interview and gives the user a chance to comprehensively review the simulated interview. At this point, the user may re-ask a previously asked question and the character repeats the response in the minimized screen.

This invention eliminates the need for users to study a linear, static menu of questions before initiating a simulation by providing intelligent prompts to guide the user to ask in-context questions relevant to the video character's response. It also interactively assists users who may be unfamiliar with the system and enhances learning by providing immediate access to interactive instructional references. Moreover, the present invention also provides accurate and timely responses to maintain a natural conversational rhythm.

It will be apparent to those skilled in the art that various modifications and variations can be made in the interactive audiovisual simulation system and method of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An interactive audiovisual system for simulating a conversation between a user and a simulated video character relating to a plurality of topics, each topic corresponding to a different state, comprising:

first storing means for storing a plurality of prerecorded audiovisual scenes;

second storing means for storing a plurality of prompts categorized into states, the prompts representing suggested voice input from the user, the prompts being associated with the audiovisual scenes;

third storing means for storing a set of sound patterns;

means for receiving voice signals corresponding to a voice input from the user;

means, responsive to the receiving means and the third storing means, for associating the received voice signals with a corresponding one of the stored sound patterns;

first selecting means, responsive to the associating means, for selecting from the first storing means audiovisual scenes corresponding to the received voice signals;

second selecting means, responsive to the first selecting means, for selecting from the second storing means a predetermined number of stored prompts corresponding to the selected audiovisual scenes;

first displaying means, responsive to the first selecting means, for displaying the selected audiovisual scenes; and second displaying means, responsive to the second selecting means, for sequentially displaying the selected prompts.

2. The system of claim 1 wherein the first selecting means includes a segment table containing segment numbers, each segment number representing corresponding stored audiovisual scenes, and an interrupt table pointing to one of the segment numbers of the segment table corresponding to the associated voice signals.

3. The system of claim 1 wherein the second selecting means includes means for choosing the plurality of prompts in accordance with a predetermined logic sequence of a current one of the states.

4. The system of claim 3 wherein the choosing means includes means for storing a list of previously displayed audiovisual scenes, and means for bypassing selection of a prompt that corresponds to one of the previously displayed audiovisual scenes in the stored list.

5. The system of claim 3 wherein the choosing means includes means for selecting a particular prompt in response to a corresponding previously displayed audiovisual scene.

6. The system of claim 3 wherein the choosing means includes means for prohibiting selection of a particular prompt in response to a corresponding previously displayed audiovisual scene.

7. The system of claim 3 wherein the choosing means includes means for accessing prompts from other states when prompts available for selection within the current state fall below the predetermined number.

8. The system of claim 1 wherein the second displaying means includes means for suppressing the display of prompts when the video simulation character is speaking.

9. An interactive audiovisual system for simulating a conversation between a user and a simulated video character relating to a plurality of topics, each topic corresponding to a different state, comprising:

first storing means for storing first and second groups of audiovisual scenes, each group including a plurality of prerecorded audiovisual scenes;

second storing means for storing a plurality of prompts categorized into states, the prompts representing suggested voice input from the user, the prompts being associated with the audiovisual scenes;

third storing means for storing a set of sound patterns;

means for receiving voice signals corresponding to a voice input from the user;

means, responsive to the receiving means and the third storing means, for associating the received voice signals with a corresponding one of the stored sound patterns;

means, responsive to the recognizing means and the first storing means, for selecting audiovisual scenes of the first group corresponding to the received voice signals;

means, responsive to the first selecting means, for displaying the selected audiovisual scenes; and interactive instructional means for providing online learning tools by temporarily suspending the simulation and displaying the second group of audiovisual scene signals stored in the first storing means.

10. The system of claim 9 wherein the selecting means includes a segment table containing segment numbers, each segment number representing corresponding stored audiovisual scenes, and an interrupt table pointing to one of the segment numbers of the segment table corresponding to the associated voice signals.

11. The system of claim 9 wherein the interactive instructional means includes means for providing an interactive dialogue between a user of the system and a prerecorded human expert consultant to aid the user during the simulation.

12. The system of claim 11 wherein the interactive dialogue means includes means for sequentially displaying a predetermined number of prompts from the current state corresponding to the output scene signals.

13. The system of claim 9 wherein the interactive instructional means includes means for presenting instructional text.

14. The system of claim 9 wherein the interactive instructional means includes means for creating and updating a list of user-specified information for subsequent retrieval.

15. The system of claim 9 wherein the interactive instructional means includes means for storing segment numbers corresponding to previously displayed audiovisual scenes.

16. The system of claim 9 wherein the interactive instructional means includes means for storing a list of previously displayed prompts.

17. The system of claim 9 wherein the interactive instructional means includes means for storing a list of previously displayed instructional text.

18. The system of claim 15 wherein the interactive instructional means includes means for displaying the previously displayed audiovisual scenes corresponding to one of the stored segment numbers.

19. The system of claim 16 wherein the interactive instructional means includes means for displaying the stored list of previously displayed prompts.

20. The system of claim 17 wherein the interactive instructional means includes means for displaying the stored list of previously displayed instructional text.

21. The system of claim 9 wherein the interactive instructional means includes means for re-initiating the temporarily suspended simulation.

22. A method for simulating a conversation between a user and a simulated video character relating to a plurality of topics, each topic corresponding to a different state, comprising the steps of:

storing a set of sound patterns;

storing a plurality of prerecorded audiovisual scenes;

storing a plurality of prompts categorized into states, the prompts representing suggested voice input from the user, the prompts being associated with the audiovisual scenes;

receiving voice signals corresponding to a voice input from the user;

associating the received voice signals with a corresponding one of the stored sound patterns;

selecting one of the stored audiovisual scenes corresponding to the received voice signals;

selecting a predetermined number of the stored prompts corresponding to the selected audiovisual scenes;

displaying the selected audiovisual scenes; and sequentially displaying the selected prompts.

23. The method of claim 22 wherein the step of selecting audiovisual scenes includes the steps of determining a segment number corresponding to the associated voice signals, and accessing the audiovisual scene corresponding to the determined segment number.

24. The method of claim 22 wherein the step of selecting prompts includes the step of choosing the plurality of prompts in accordance with a predetermined logic sequence of a current one of the states.

25. The method of claim 24 wherein the choosing step includes the steps of storing a list of previously displayed audiovisual scenes, and bypassing selection of a prompt that corresponds to one of the previously displayed audiovisual scenes in the stored list.

26. The method of claim 24 wherein the choosing step includes the step of selecting a particular prompt in response to a corresponding previously displayed audiovisual scene.

27. The method of claim 24 wherein the choosing step includes the step of prohibiting selection of a particular prompt in response to a corresponding previously displayed audiovisual scene.

28. The method of claim 24 wherein the choosing step includes the step of accessing prompts from other states when prompts available for selection within the current state fall below the predetermined number.

29. The method of claim 22 wherein the step of displaying prompts includes the step of suppressing the display of prompts when the video simulation character is speaking.

30. A method for simulating a conversation between a user and a simulated video character relating to a plurality of topics, each topic corresponding to a different state, comprising the steps of:

storing a set of sound patterns;

storing a first and second group of prerecorded audiovisual scenes each group including a plurality of prerecorded audiovisual scenes;

storing a plurality of prompts categorized into states, the prompts representing suggested voice input from the user, the prompts being associated with the audiovisual scenes;

receiving voice signals corresponding to a voice input from the user;

associating the received voice signals with a corresponding one of the stored sound patterns;

selecting one of the stored audiovisual scenes from the first group of audiovisual scenes corresponding to the received voice signals;

displaying the selected audiovisual scenes; and providing online learning tools by temporarily suspending the simulation and displaying the second group of stored audiovisual scenes.

31. The method of claim 30 wherein the selecting step includes the steps of determining a segment number corresponding to the associated voice signals, and accessing the audiovisual scene corresponding to the determined segment number.

32. The method of claim 30 wherein the providing step includes the step of providing an interactive dialogue between a user of the system and a prerecorded human expert consultant to aid the user during the simulation.

33. The system of claim 32 wherein the providing step includes the steps of selecting a predetermined number of stored prompts corresponding to the selected audiovisual scenes, and interactive dialogue means includes means for sequentially displaying a predetermined number of prompts from the current state corresponding to the output scene signals.

34. The method of claim 30 wherein the providing step includes the step of presenting instructional text.

35. The method of claim 30 wherein the providing step includes the step of creating and updating a list of user-specified information for subsequent retrieval.

36. The method of claim 30 wherein the providing step includes the step of storing segment numbers corresponding to previously displayed audiovisual scenes.

37. The method of claim 30 wherein the providing step includes the step of storing a list of previously displayed prompts.

38. The method of claim 30 wherein the providing step includes the step of storing a list of previously displayed instructional text.

39. The method of claim 36 wherein the providing step includes the step of for displaying the previously displayed audiovisual scenes corresponding to one of the stored segment numbers.

40. The method of claim 37 wherein the providing step includes the step of displaying the stored list of previously displayed prompts.

41. The method of claim 38 wherein the providing step includes the step of displaying the stored list of previously displayed instructional text.

42. The method of claim 30 wherein the providing step includes the step of re-initiating the temporarily suspended simulation.

* * * * *